(12) United States Patent
Elliott

(10) Patent No.: US 9,216,379 B2
(45) Date of Patent: Dec. 22, 2015

(54) METHOD AND APPARATUS FOR DRYING COMPRESSED AIR

(76) Inventor: Brian Scott Elliott, Houston, TX (US)

(*) Notice: Subject to any disclaimer, the term of this patent is extended or adjusted under 35 U.S.C. 154(b) by 0 days.

(21) Appl. No.: 13/431,300

(22) Filed: Mar. 27, 2012

(65) Prior Publication Data

US 2013/0255312 A1    Oct. 3, 2013

(51) Int. Cl.
*B01D 45/00* (2006.01)
*B01D 53/26* (2006.01)
*B01D 45/08* (2006.01)
*B01D 53/00* (2006.01)

(52) U.S. Cl.
CPC .............. *B01D 53/265* (2013.01); *B01D 45/08* (2013.01); *B01D 53/002* (2013.01); *B01D 2257/504* (2013.01); *Y02C 10/04* (2013.01); *Y02C 10/06* (2013.01)

(58) Field of Classification Search
CPC ...................... B01D 2257/504; B01D 19/0036; B01D 45/08; B01D 53/002; Y02C 10/04
USPC ............ 55/443–446, DIG. 17, 467, 468, 473, 55/428, 433, 432; 96/389, 193; 95/31, 32, 95/39, 267, 288
See application file for complete search history.

(56) References Cited

U.S. PATENT DOCUMENTS

| | | | | |
|---|---|---|---|---|
| 3,447,290 A | * | 6/1969 | Flory | .............................. 55/322 |
| 3,765,168 A | * | 10/1973 | Wagle | .............................. 60/782 |
| 5,409,514 A | * | 4/1995 | Ragusa et al. | ................... 55/319 |
| 6,206,953 B1 | * | 3/2001 | Bangs | .............................. 95/268 |
| 2006/0260468 A1 | * | 11/2006 | Amin | .............................. 95/153 |

* cited by examiner

*Primary Examiner* — Dung H Bui

(57) ABSTRACT

This invention relates to a method and apparatus to remove unwanted water moisture from industrial, commercial and home shop compressed air systems. The invention removes water through the process of thermal condensation. The reduced temperatures are generated by utilizing the Joule-Thompson effect through the manipulation of the pressure or pressures generated by the attached air compressor

1 Claim, 4 Drawing Sheets

METHOD AND APPARATUS FOR DRYING COMPRESSED AIR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Compressed air systems are utilized in a wide variety of applications and industries ranging from automobile repair and dry cleaning to manufacturing and construction. In areas where relative humidity is high, water build-up in air lines can cause severe problems. Water in the air lines can shorten the life of air tools, clump media in sandblasting operations, ruin delicate parts during air jet cleaning processes, damage air-driven components within machinery or produce inferior painted surfaces. There are a number of devices on the market intended to remove free moisture from compressed air streams. The bulk of these devices are very expensive, large, exhibit environmental concerns, are maintenance-intensive and operationally sensitive. Therefore, a dryer that is not burdened by these traits would be an attractive solution to the problem of free moisture in the air stream for many compressed air users. The majority of compressors in operation today are of a two-stage design that produces a discharge pressure that is too high to be properly utilized in day-to-day operations. Therefore, these compressors must either be used at a reduced output pressure or incorporate a pressure reducing valve, or regulator, on their output. Reducing the output pressure is undesirable because these compressors produce their highest efficiency at high pressures. Therefore, the use of a pressure reducing regulator is the most desirable configuration for these compressors. During the pressure reduction process, the Joule-Thompson effect comes into play forcing the expanding air to cool, which then condenses out any entrained moisture in the form of a fine fog. The entrained fog is carried into the distribution system and eventually finds its way to the pneumatic applications, where it can effect a great deal of damage on the components. Additionally, the entrained fog will collect in the pipes of the distribution system where it will cause severe internal corrosion. Therefore, a dryer that incorporates an integral pressure reducing regulator that is coupled with a specially designed element for consolidating the entrained moisture, which can take advantage of the Joule-Thompson effect, would be a rather attractive solution to the problem of free moisture in the air stream for many compressed air users.

BRIEF SUMMARY OF INVENTION

This invention relates to a device that is designed to remove excess moisture from the discharge of industrial, commercial and home shop air compressors. Specifically, the invention is intended to eliminate free moisture from the compressed air discharge through a unique configuration of components that allows the manipulation of the Joule-Thompson effect to cool the compressed air and condense out excess moisture. The invention is a unique arrangement of components that takes advantage of the Joule-Thompson effect with the intention of removing free moisture from a compressed air stream through condensation. The compressed air is expanded, which produces a cooling effect and generates a low temperature cloud that is contained within a chamber. As the air expands and cools, it loses its ability to retain moisture and the water condenses into a fog within the chamber. The condensed water and expanded air are forced to flow through the walls of the chamber, which are made of a porous material that acts as a separation element and is cooled by the expanded air. The separation element also provides a coalescing function. While passing through the separation element, the micro-droplets that make up the entrained fog are forced to collide with the element and/or other droplets. This, in turn, forces the entrained fog to consolidate into larger droplets that can be affected by gravity. The larger droplets drip down into a condensate trap which consists of a reservoir with a drain. The dried air is extracted from the top of the reservoir. At this point, the dried air may be introduced into the overall compressed air system. The detailed description of the invention does not reference any specific sizes, pressures or flow rates because the design may be scaled to accommodate any size compressor from fractional to multi-thousand horse power.

DETAILED DESCRIPTION OF THE INVENTION

Figure 1:
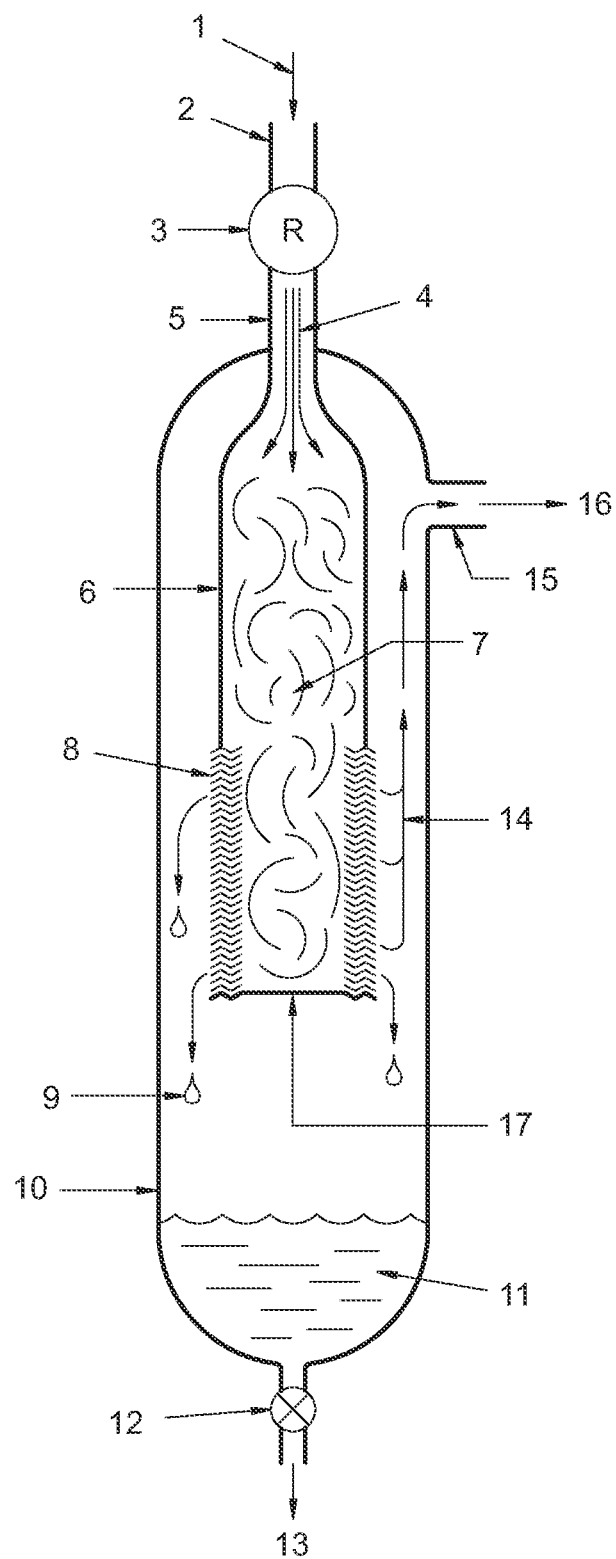
FIG. 1. is a schematic representation of the invention.

FIG. 1. High pressure compressed air 1 is introduced into the input port 2 of a pressure reducing regulator 3. The expanded air 4 is channeled through the filter port 5 and into the filter 6. The expanded air 4 cools and water vapor condenses out forming a fog 7 within the expansion chamber 6. The expanded air 4 and the fog 7 are forced to flow through the expansion chamber 6 and the filter element 8, which is cooled by the expanded air 4. The filter element 8 also provides a consolidation function transforming the fog 7 into droplets 9 that are large enough to be affected by gravity. The droplets 9 drip down into a trap 10 and the condensate 11 collects in the bottom of the trap 10. The collected condensate 11 is periodically drained through the drain valve 12 and the drain discharge port 13. The dried air 14 passes through the separation element 8 and through the output port 15 where it is directed to the applications 16.

Figure 2:
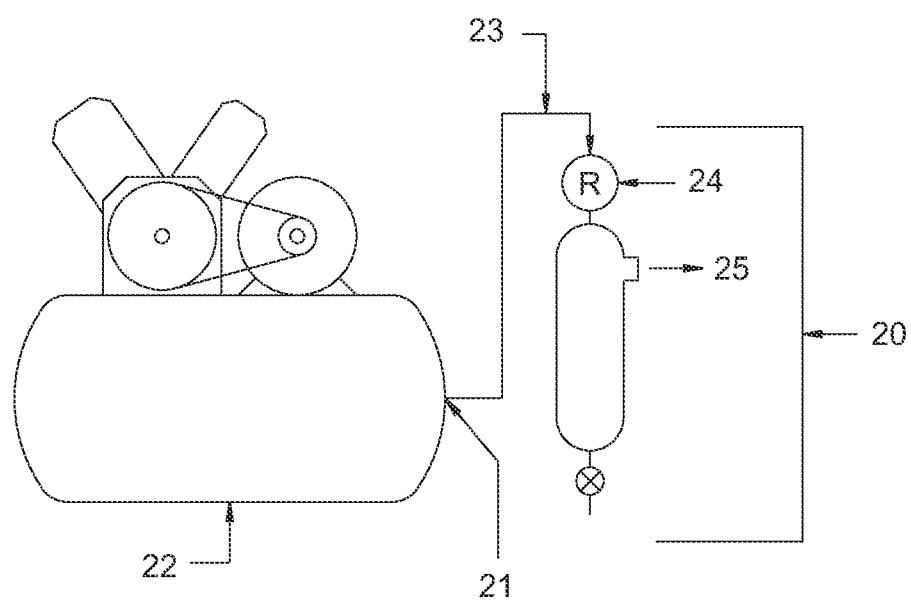
FIG. 2. is a schematic representation of the invention installed on an air compressor.

FIG. 2. The dryer 20 is connected to the output 21 of a high pressure compressor 22 via a pipe manifold 23. The pressure reducing regulator 24 is set to an appropriate output pressure and the output of the dryer 25 is directed to applications.

Figure 3:
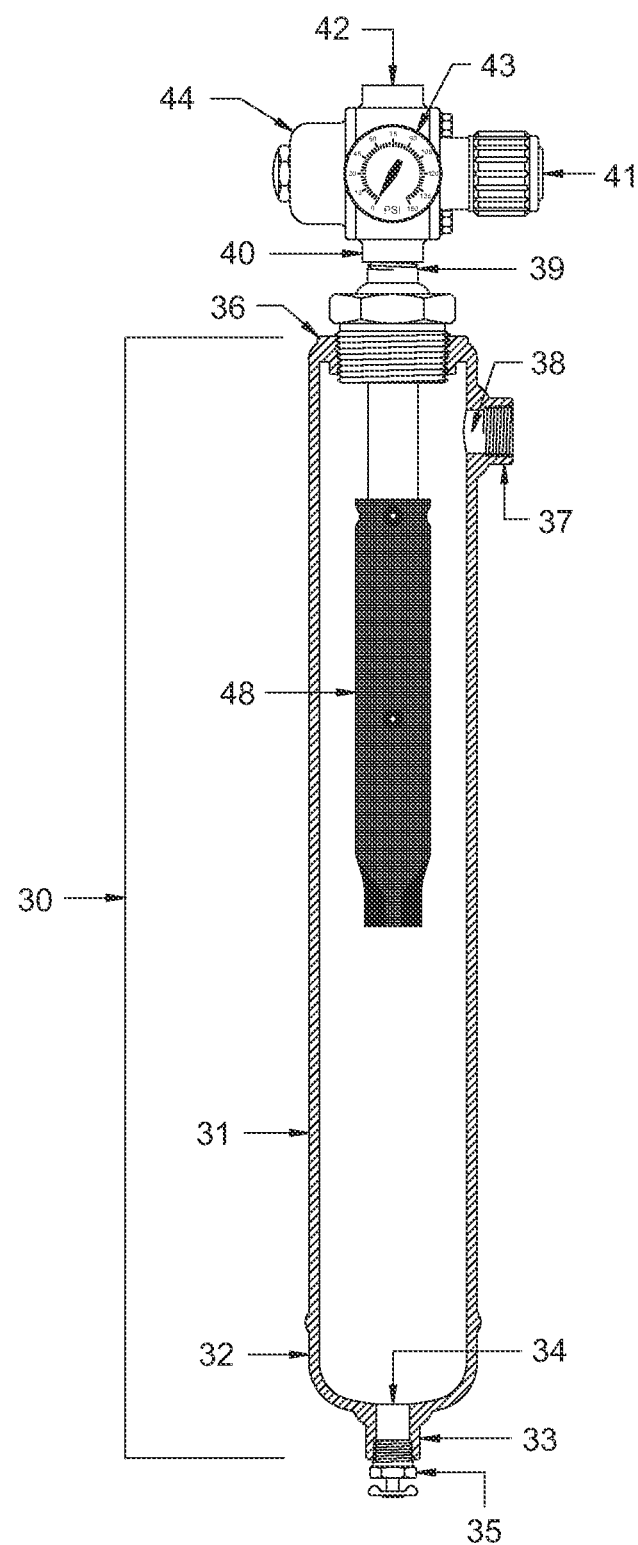
FIG. 3. is a sectional view of the preferred embodiment.

FIG. 3. The dryer body 30 is comprised of a piece of Schedule 40 pipe 31 with a welded cap 32 which has a ½" NPT half-coupling 33 welded in alignment to a drilled hole 34. The ½" NPT half-coupling 33 mounts a drain valve 35. An NPT tank fitting 36 is welded to the upper end of the Schedule 40 pipe 31. An NPT half-coupling 37 is welded in alignment to a drilled hole 38 in the Schedule 40 pipe 31. The separation element 48 is screwed into the NPT tank fitting 36. The pressure reducing regulator 44 is screwed onto the nipple 39 of the separation element 48. An output pressure gauge 43 is attached to the pressure reducing regulator 44. Compressed air is introduced to the input port 42 of the pressure reducing regulator 44. Output pressure is set using the adjustment knob 41 on the pressure reducing regulator 44.

Figure 4:
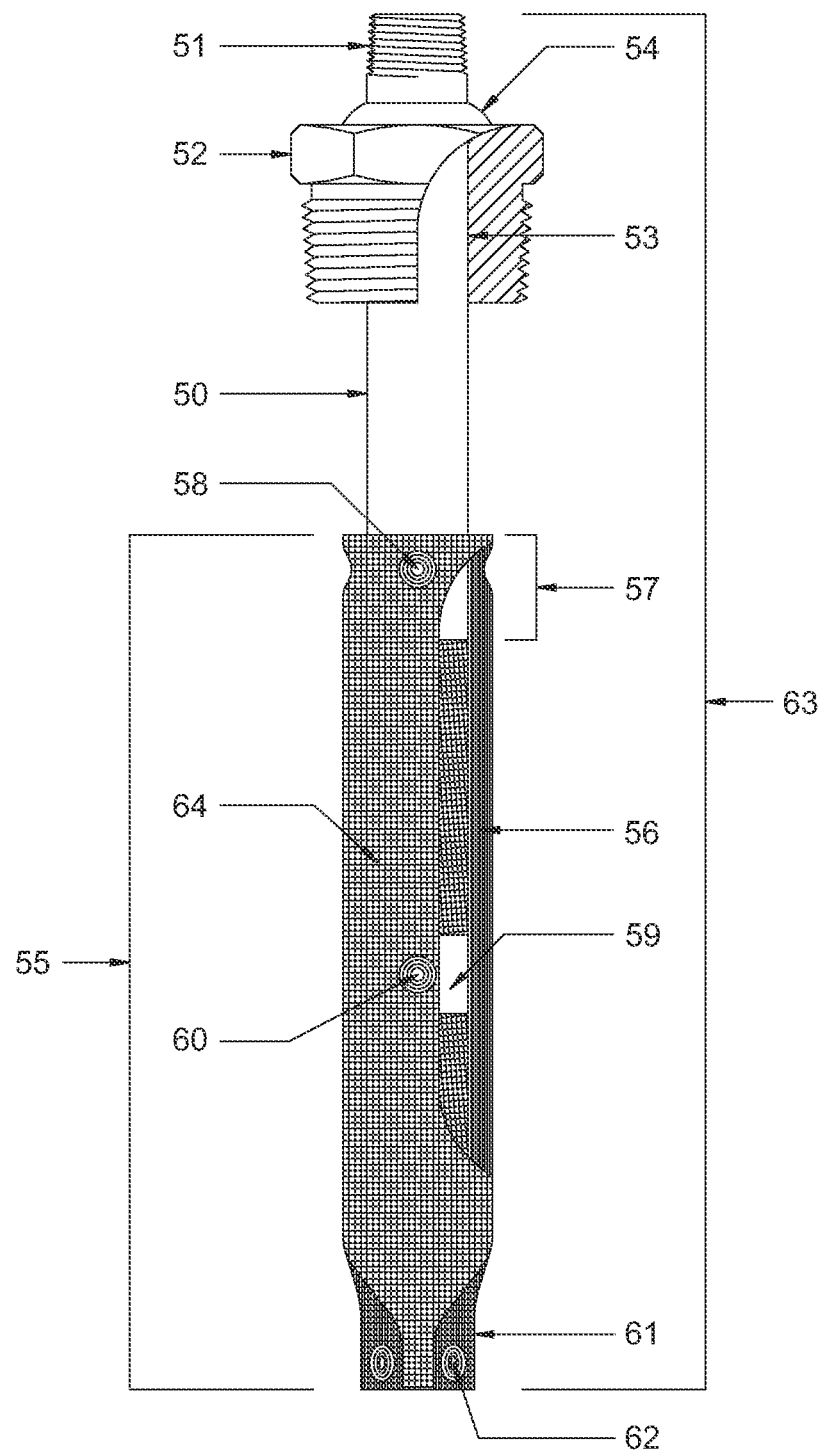
FIG. 4. is a partial sectional view of the internal separation element.

FIG. 4. The separation assembly 63 is comprised of a piece of schedule 40 pipe 50 that has been threaded on one end with an NPT thread 51. The schedule 40 pipe 50 is placed into a forged steel bushing 52 that has been bored through 53 with a diameter that closely matches the outside diameter of the schedule 40 pipe 50. The schedule 40 pipe 50 is fixed to the reducing bushing 52 with a seal weld 54. The separation element 55 is formed by wrapping several layers 56 of a fine mesh screen 64. The top end of the separation element 55 overlaps 57 the schedule 40 pipe 50 and is fixed by several spot welds 58. The lower end of the separation element 55 is closed with a three point pinch 61. The three point pinch is secured with three spot welds 62. The center diameter of the separation element is stabilized with a short section of schedule 40 pipe 59 that is held in place by a spot weld 60.

What is claimed is:

1. A system which removes entrained moisture from compressed air comprising;
   a. a pressure reducing valve that is connected to an inner cylinder and an outer cylinder with a tubular connection;
   b. wherein the compressed air flows through the pressure reducing valve where the compressed air pressure reduces and expands;
   c. wherein the inner cylinder includes an upper section with solid walls and a lower section with labyrinth walls that are comprised of a coil of screen, and a bottom of the labyrinth is closed off by a plate or other means to form an inner cavity of the inner cylinder;
   d. wherein the compressed air expands into the inner cavity and undergoes adiabatic cooling, the moisture in the adiabatic cooled compressed air condenses and forms micro water droplets that are held in suspension within the adiabatic cooled compressed air;
   e. wherein the adiabatic cooled compressed air and the micro water droplets flow through the labyrinth walls and the micro water droplets wet to the labyrinth walls to form a larger concentration of water and the larger concentration of water leaves the labyrinth walls and forms large water droplets that are affected by gravity;
   g. wherein the inner cylinder is enclosed by the outer cylinder;
   h. wherein the outer cylinder includes a top end that has a reduced diameter that is sealed to the outside of the tubular connection and a bottom end having a reduced diameter that forms a drain port and a upper section having a compressed air side port outlet;
   i. wherein the drain port has a drain valve;
   j. wherein the large water droplets fall into the bottom end of the outer cylinder to form a volume of water that is periodically drained through the drain port and the drain valve and the compressed air flows to the upper section of the outer cylinder and out of the compressed air side port outlet.

* * * * *